(12) United States Patent
Leblanc et al.

(10) Patent No.: US 7,350,765 B2
(45) Date of Patent: Apr. 1, 2008

(54) DOUBLE-STOP FLOATING BALL VALVE

(75) Inventors: John R. Leblanc, Spring, TX (US); Jimmy Fultz, Houston, TX (US); Ryan Gustafson, Houston, TX (US)

(73) Assignee: Hydril Company LP, Houston, TX (US)

( * ) Notice: Subject to any disclaimer, the term of this patent is extended or adjusted under 35 U.S.C. 154(b) by 155 days.

(21) Appl. No.: 11/175,902

(22) Filed: Jul. 6, 2005

(65) Prior Publication Data

US 2007/0007483 A1    Jan. 11, 2007

(51) Int. Cl.
*F16K 5/06* (2006.01)

(52) U.S. Cl. .................. 251/315.01; 251/286; 251/174

(58) Field of Classification Search ................ 251/170, 251/174, 180, 181, 175, 192, 315.01, 286; 166/321, 332.3
See application file for complete search history.

(56) References Cited

U.S. PATENT DOCUMENTS

| | | | |
|---|---|---|---|
| 1,906,266 A | | 5/1933 | Hoffman |
| 3,039,484 A | | 6/1962 | Bredtschneider |
| 3,266,769 A | * | 8/1966 | Shand .......................... 251/172 |
| 3,433,252 A | * | 3/1969 | Kennard ....................... 137/496 |
| 3,821,984 A | | 7/1974 | Lee |
| 4,332,267 A | * | 6/1982 | Evans ........................... 137/1 |
| 4,480,813 A | | 11/1984 | Holley |
| 4,572,239 A | * | 2/1986 | Koch et al. ............ 137/625.47 |
| 4,660,596 A | * | 4/1987 | Ashford ....................... 137/496 |
| 4,697,787 A | | 10/1987 | Pelleboer |
| 5,246,203 A | | 9/1993 | McKnight et al. |
| 5,507,467 A | | 4/1996 | Mott |
| 6,085,845 A | * | 7/2000 | Patel et al. .................. 166/373 |
| 6,540,206 B2 | | 4/2003 | Guerra |
| 6,648,001 B2 | * | 11/2003 | Chatufale .................... 251/175 |
| 6,662,886 B2 | | 12/2003 | Russell |
| 6,715,557 B2 | * | 4/2004 | Wetzel et al. ................ 166/373 |

* cited by examiner

*Primary Examiner*—Ramesh Kirshnamurthy
*Assistant Examiner*—Cloud Lee
(74) *Attorney, Agent, or Firm*—Osha Liang LLP

(57) ABSTRACT

Valve assemblies and methods of designing valve assemblies having a valve ball, an upper seat, and a lower seat. When fluid pressure is applied to the valve ball, the valve ball will float in the axial direction between an upper position, a neutral position, and a lower position in response to fluid pressure. The valve assembly may be made suitable for internal blowout preventers.

23 Claims, 7 Drawing Sheets

DOUBLE-STOP FLOATING BALL VALVE

BACKGROUND OF INVENTION

1. Field of the Invention

The invention relates generally to blowout preventers used in the oil and gas industry. Specifically, the invention relates to a ball valve blowout preventer with two biasing seats, allowing the valve ball to float.

2. Background Art

Well control is an important aspect of oil and gas exploration. When drilling a well, for example, in oil and gas exploration applications, safety devices must be put in place to prevent injury to personnel and damage to equipment resulting from unexpected events associated with the drilling activities.

Drilling wells in oil and gas exploration involves penetrating a variety of subsurface geologic structures, or "layers." Occasionally, a wellbore will penetrate a layer having a formation pressure substantially higher than the pressure maintained in the wellbore. When this occurs, the well is said to have "taken a kick." The pressure increase associated with the kick is generally produced by an influx of formation fluids (which may be a liquid, a gas, or a combination thereof) into the wellbore. The relatively high pressure kick tends to propagate from a point of entry in the wellbore uphole (from a high pressure region to a low pressure region). If the kick is allowed to reach the surface, drilling fluid, well tools, and other drilling structures may be blown out of the wellbore. These "blowouts" often result in catastrophic destruction of the drilling equipment (including, for example, the drilling rig) and substantial injury or death of rig personnel.

Because of the risk of blowouts, blowout preventers ("BOP") are typically installed at the surface or on the sea floor in deep water drilling arrangements to effectively seal a wellbore until active measures can be taken to control the kick. Blowout preventers may be activated so that kicks may be adequately controlled and circulated out of the system.

Just as a kick will propagate up the well, it may also enter the drill string and propagate through the inside of the drill string. To control a kick inside the drill string, a drill string internal blowout preventer ("IBOP"), sometimes called a "kelly valve" or a "kelly cock," is used to seal off the drill string until measures can be taken to control the kick. An example of a Kelly cock is disclosed in U.S. Pat. No. 4,480,813, and incorporated herein by reference in its entirety. (An IBOP is sometimes called a "kelly valve" because, on older-style rigs, the IBOP was typically located near the "kelly," which is a non-circular part of the drill string that is used to impart rotary motion to the drill string.)

An IBOP can be formed from of a variety of different types of valves, but a ball valve configuration is the most standard type. Ball valve type IBOPs typically include a valve ball that is located between two seats in the middle of a passage. The valve ball has a through hole, and can be rotated between two positions. U.S. Pat. No. 5,246,203 issued to McKnight et al. ("McKnight"), incorporated by reference in its entirety, discloses an oilfield valve that incorporates a ball valve mechanism. The mechanics of a basic ball valve mechanism are demonstrated in the McKnight patent. In a first position, as demonstrated in FIG. 1A, the through hole of the valve ball will align with the passage of the pipe or drill string. This position will allow complete, undisrupted fluid flow through the passage. The valve ball can then be rotated from this position into a second position, as demonstrated in FIG. 1B, to be misaligned with the passage of the pipe, disrupting fluid flow. Each of the seats surrounding the valve ball, one upper seat and one lower seat, seal against the valve ball, not allowing flow between the valve ball and the seat. Thus, the valve ball, coupled with the two seats sealing against the valve ball, can completely stop flow through the pipe passage when the valve ball is positioned to misalign with the through hole passage by having the seats seal up against the valve ball. In FIG. 1B, a seal is made between the seats, 101 and 102, and the ball valve, 105, to completely prohibit flow through the passage. The valve ball has the ability to seal against the seats to be effective against even the highest of pressures, allowing the arrangement to be used as an IBOP.

One issue with this type of ball valve arrangement is that when the valve ball is in the second position, blocking flow through the passage, as seen in FIG. 1B, a force is being transmitted to the valve ball across the diameter of the valve ball, placing the valve ball under a compressive force. The compressive force is translated through the ball to act at highest stress on points 110 and 111, where the points 110, 111 are relatively thin metal sections. The high stress may lead to deformation, crushing the ball. When the valve ball begins to deform, the generally round flow through passage of the ball warps into a narrower passage, representing that of an ellipse. After being deformed, when the valve ball is in the "closed" second position, the seal between the valve ball and the seats is undermined because of uneven contact between the seats and the valve ball. As well, in the "open" first position, the deformed valve ball will disrupt fluid flow through the passage because the elliptical through hole of the valve ball will not completely align with the round passage.

McKnight discloses an oilfield valve that includes a ball valve mechanism that seeks to reduce any valve ball deformation. An embodiment disclosed by McKnight is shown in FIG. 2, which shows an oilfield ball valve 200 that includes a valve ball 205, and an upper and a lower seat 210, 220 sealed against the valve ball 205. The lower seat 220 is supported by a spring 221 underneath, while the upper seat 210 is firmly positioned in the passage. When a fluid force is applied from above, the valve ball 205 translates the fluid force to the lower seat 220, and the lower seat 220 translates the fluid force to the spring 221 supporting it. If the fluid force is large enough, the spring 221 will compress. During compression, the lower seat 220 moves with the spring 221, and the valve ball 205 "floats" down to stay in sealing contact with the lower seat 220. Because the upper seat 210 is firmly positioned in the passage, the upper seat 210 does not move with the valve ball 205. The space between the upper seat 210 and the valve ball 205 provides an opening for the fluid to travel through. The fluid then fills up the valve ball 205, which translates the fluid force through the lower end of the valve ball 205 into the lower seat 220.

The translation of the fluid force is shown in FIG. 1B. As the fluid enters the valve ball 105, the fluid force moves from position 151, on the outer diameter on top of the valve ball 105, to position 152, on the inner diameter inside of the valve ball 105. In this fashion, the valve ball 105 will no longer experience a crushing load. Accordingly, the stress on the valve ball 105 is moved to section 115, one arcuate side of the valve ball. As a result, the fluid force is more directly translated to the lower seat 101.

An issue with having a ball valve arrangement with a spring loaded lower seat, as described above, is that the valve ball can only float in one direction. When fluid force comes from above the passage, translating down on the valve ball, the valve ball is able to float against the lower seat if necessary to prevent the valve ball from deforming. However, such an assembly does not allow the ball to float in the upward direction. Thus, when the valve ball is in its closed position and the fluid force coming from below the valve ball is too great, the valve ball will still deform from stress. The valve ball deformation is because the ball valve arrangement does not provide an opening for the upward flowing fluid, fluid flowing opposite to the direction the valve ball is allowed to float in, to travel into the valve ball and redistribute the stresses on the valve ball.

U.S. Pat. No. 6,662,886 issued to Russell ("Russell") discloses another type of ball valve assembly and is incorporated by reference in its entirety. Russell discloses a ball valve that comes in a preassembled valve cartridge for use as a mudsaver valve. The cartridge ball valve assembly includes a sealing spring loaded lower seat, similar to that of the McKnight patent. A difference is that the ball valve disclosed by Russell does not have an upper seat that seals against fluid pressure exerted from below. Russell discloses that allowing pressure to be transmitted past the upper seat is advantageous because it allows for the pressure to be monitored by a pressure sensor upstream from the ball valve. For an IBOP, allowing pressure to transmit across the closed valve ball in either direction is undesirable.

For an IBOP, crushing amounts of fluid pressure may come from above and below. Accordingly, relief of the fluid pressure while preventing communication of the fluid pressure may be desirable in IBOP applications. What is still needed, therefore, are improved ball valve assemblies, particularly for use in IBOPs.

SUMMARY OF INVENTION

In one aspect, the present invention relates to a valve assembly. The valve assembly includes a housing having a passage therethrough and a valve ball having a through hole. The valve ball is inside the housing and rotatable between an open and a closed position with the open position aligning with the passage and the closed position misaligning with the passage. The valve assembly further includes an upper seat inside the housing located above the valve ball and biased towards the valve ball, and a lower seat inside the housing located below the valve ball and biased towards the valve ball. The valve ball is moveable in an axial direction between a lower position, a neutral position, and an upper position.

In another aspect, the present invention relates to an internal blowout preventer. The internal blowout preventer includes a housing having a passage therethrough with the housing configured to be connected to a drill string and a valve ball having a through hole. The valve ball is inside the housing and is rotatable between an open and closed position with the open position aligning with the passage and the closed position misaligning with the passage. The valve ball is moveable in an axial direction between a lower position, a neutral position, and an upper position. The internal blowout preventer further includes a rotation means for rotating the valve ball between the open position and the closed position, an upper seat inside of the housing located above the valve ball, and a lower seat inside the housing located below the valve ball. Also, the internal blowout preventer includes a biasing means for biasing the upper seat into sealing contact with the valve ball when the valve ball is in the upper position and the neutral position and a biasing means for biasing the lower seat into sealing contact with the valve ball when the valve ball is the neutral position and the lower position. A spacer inside the housing between the upper seat and the lower seat and at least partially surrounding the valve ball is also included in the internal blowout preventer.

In another aspect, the present invention relates to a valve assembly. The valve assembly includes a housing having a passage therethrough and a valve ball having a through hole. The valve ball is inside the housing and is rotatable between an open and closed position with the open position aligning with the passage and the closed position misaligning with the passage. The valve ball is moveable in an axial direction between a lower position, a neutral position, and an upper position. The valve assembly further includes a rotation means for rotating the valve ball between the open position and the closed position, an upper seat inside of the housing located above the valve ball, and a lower seat inside the housing located below the valve ball. Also, the valve assembly includes a biasing means for biasing the upper seat into sealing contact with the valve ball when the valve ball is in the upper position and the neutral position and a biasing means for biasing the lower seat into sealing contact with the valve ball when the valve ball is the neutral position and the lower position.

In another aspect, the present invention relates to a method of designing a valve assembly with a valve ball, an upper seat, and a lower seat. The method includes determining an upper position pressure at which the valve ball changes from the neutral position to a lower position and determining a lower position pressure at which the valve ball changes from the neutral position to a lower position. The method further includes selecting a distance the valve ball may move in an axial direction between the lower position and the upper position. Then, at least one of the group consisting of an upper spring coefficient, a lower seat travel distance, and an inner diameter of the lower seat is selected based on the upper position pressure. At least one of the group consisting of a lower spring coefficient, an upper seat travel distance, and an inner diameter of the upper seat is selected based on the lower position pressure.

Other aspects and advantages of the invention will be apparent from the following description and the appended claims.

DETAILED DESCRIPTION

The present invention relates to ball valve assemblies. More specifically, embodiments of the present invention provide high and low pressure sealing ability on both sides of the ball valve in a manner suitable for use in an IBOP.

Figure 3:
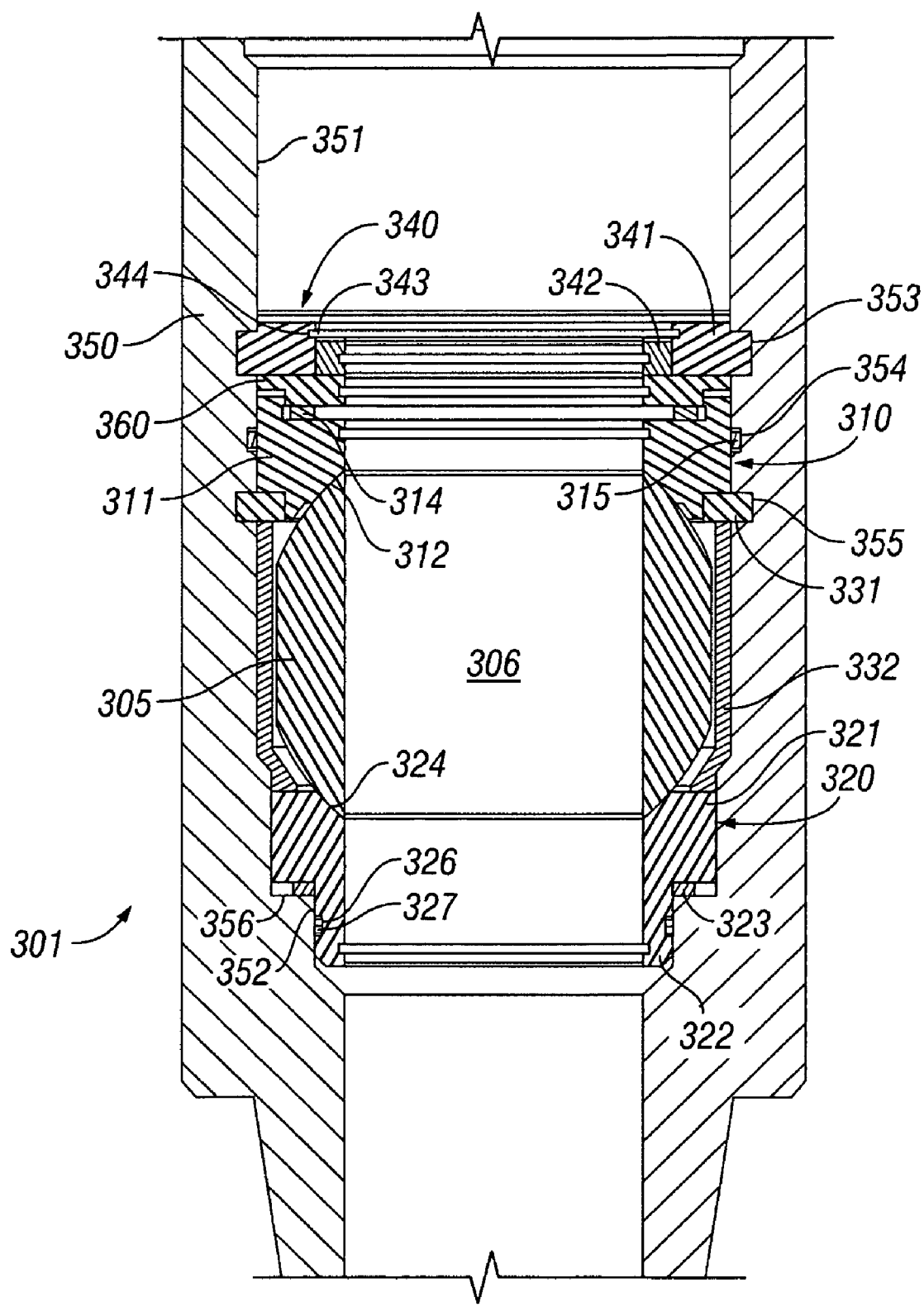
FIG. 3 is a cross-sectional view of a ball valve mechanism in accordance with an embodiment of the present invention.

FIG. 3 is a cross-sectional view of a ball valve assembly 301, in accordance with one embodiment of the invention. The major components of the ball valve assembly 301 are a housing 350, an upper seat assembly 310, a lower seat assembly 320, a valve ball 305, and a spacer 332. In this embodiment, the housing 350 includes an upper passage section 351 and a lower passage section 352. The upper passage section 351 may be larger than the lower passage section 352.

In this embodiment, the lower seat assembly 320 may have an upper end 321 and a lower end 322. As shown, the lower end 322 is received in the lower passage section 352 by the housing 350. In this embodiment, the lower seat 320 sits on a biasing mechanism, in which the biasing mechanism is a wave spring 323. The wave spring 323 is in a partially-compressed state between a housing shoulder 356 and the lower seat 320. The wave spring 323, when partially-compressed, provides a spring force that translates up through the lower seat 320. The upper end 321 of the lower seat assembly 320 generally has a rounded arcuate surface 324. The rounded arcuate surface 324 of the lower seat 320 is in contact with the valve ball 305, and is able to seal against pressure in either direction. The force that the wave spring 323 applies to the lower seat 320 helps keep the valve ball 305 in sealing contact with the lower seat 320. Those having ordinary skill in the art will appreciate that other biasing mechanisms, such as Bellville washers, helical springs, and elastomeric material, may be used instead of a wave spring without departing from the scope of the present invention.

In this embodiment, the upper seat assembly 310 is designed to have sealing contact with the valve ball 305. The upper seat 310 generally has a rounded arcuate surface 312, which corresponds to the surface of the valve ball 305 to provide better sealing contact between the valve ball 305 and the upper seat 310. The upper seat 310 has a biasing mechanism located above it, in which the biasing mechanism is a wave spring 314. The wave spring 314 is partially-compressed between the upper seat 310 and a securing mechanism 340. Similar to the lower wave spring 323, the upper wave spring 314 translates a spring force through the upper seat 310 and assists in the sealing contact between the valve ball 305 and the upper seat 310. Those having ordinary skill in the art will appreciate that other biasing mechanisms, such as Bellville washers, helical springs, and elastomeric material, may be used instead of a wave spring without departing from the scope of the present invention.

The valve ball 305 has a through hole 306. In the pictured embodiment, the through hole 306 forms a generally cylindrical passage. The valve ball 305 rotates between an "open" position, in which the through hole 306 of the valve ball 305 is aligned with the passage 351, and a "closed" position, in which the through hole 306 of the valve ball 305 is misaligned with the passage 351. The valve ball may have a smooth exterior as to provide a better surface for sealing against the upper seat 310 and the lower seat 320. Because the upper seat 310 and the lower seat 320 are biased towards the valve ball 305, spring loaded in this embodiment, the valve ball 305 has the ability to move up and down in the housing 310 and keep sealing contact with each of the seats 310, 320 at the sealing surfaces 312, 324. The position in which the valve ball 305 is in sealing contact with the upper valve seat 310 and the lower valve seat 320 is referred to as the "neutral position" of the valve ball 305.

Figure 4:
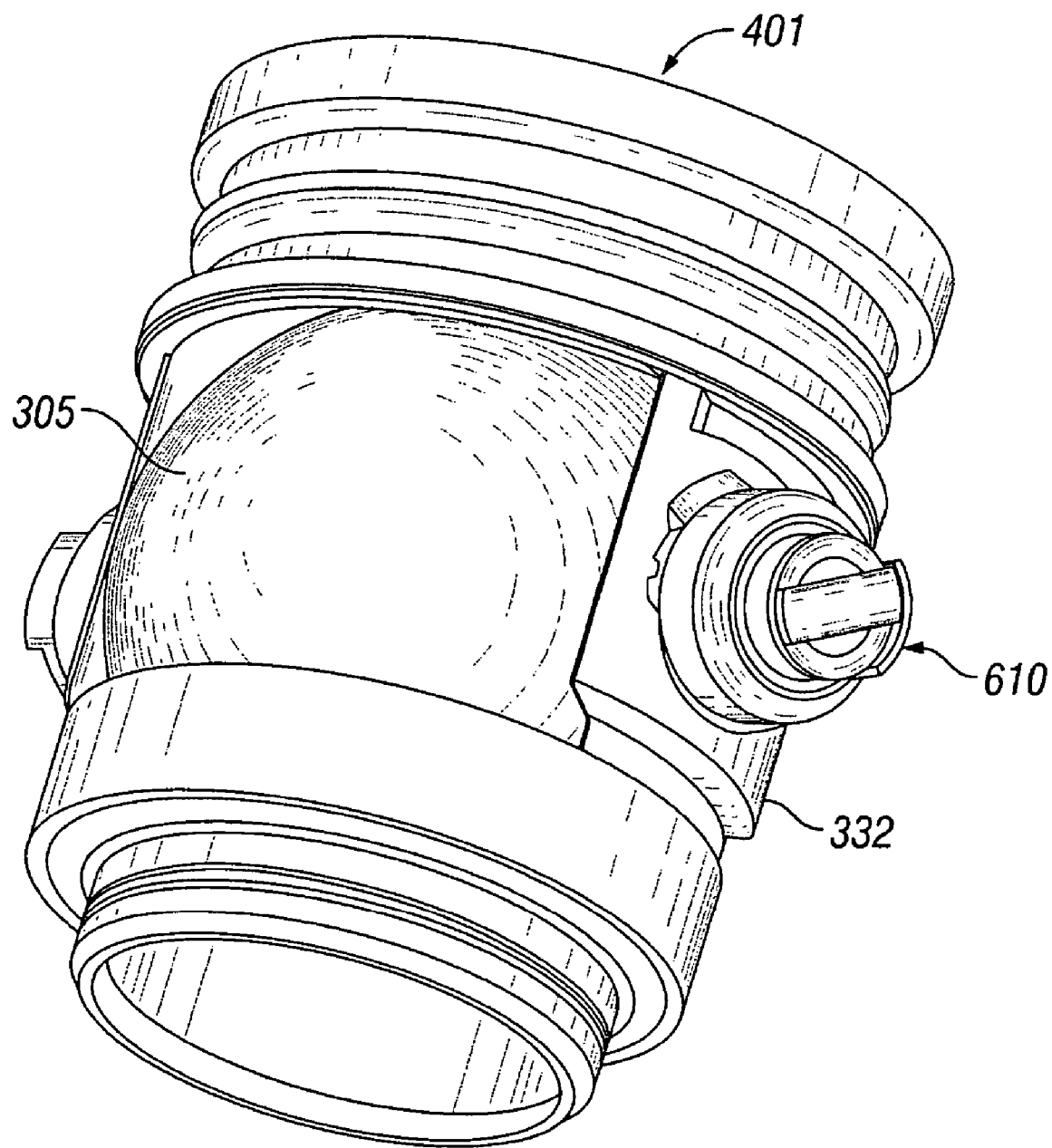
FIG. 4 is an isometric view of a ball valve mechanism in accordance with an embodiment of the present invention.

The particular embodiment shown in FIG. 3 further includes an upper seat stop 331 below the upper seat 310 that fits into a groove 355 of the housing 350. The upper seat stop 331 limits the movement of the upper seat 310. Adjacent to a surface of the upper seat stop 331 is a spacer 332. The spacer 332 is positioned between the upper seat stop 331 and the lower seat 320. The spacer 332 partially encompasses the valve ball 305, keeping the valve ball 305 from moving in the radial direction. FIG. 4 is an isometric view of a ball valve assembly 401, in accordance with one embodiment of the invention. The ball valve assembly 401 includes a rotation device 610 for rotating the ball valve 305. The rotation device 610 is discussed more fully below. When the spacer 332 is positioned adjacent to the upper seat stop 331, the spacer 332 limits the movement of the lower seat 320. With the upper seat stop 331 and the spacer 332 in place, the upper seat 310 and lower seat 320 are limited in axial movement up and down the passage 351.

When the valve ball 305 is in the closed position and blocking flow through the passage 351 from above, the fluid applies pressure against the valve ball 305. The pressure against the valve ball 305 translates as a downward force to the lower wave spring 323. If the pressure is great enough, the lower wave spring 323 compresses and the lower seat 320 moves downward in the axial direction. As the lower seat 320 moves downward, the valve ball 305 moves downward with the lower seat 320, staying in sealing contact with the lower seat 320. As the valve ball 305 moves downward, the upper seat 310 moves downward with the valve ball 305. As the upper seat 310 moves downward, the upper wave spring 312 extends from the original partially-compressed state. As the upper wave spring 312 extends, the wave spring 312 continues to bias the upper seat 310 towards to the valve ball 305, keeping the upper seat 310 and the valve ball 305 in sealing contact. As the upper seat 310 moves downward, the upper seat stop 331 allows the upper seat 310 to move only a selected distance before contact is made between the upper seat 310 and the upper seat stop 331, preventing any further movement of the upper seat 310. If the fluid applies any additional pressure to the valve ball 305, when the upper seat 310 is in contact with the upper seat stop 331, the valve ball 305 and the lower seat 320 continue to move down the passage 351 and the upper seat 310 stays in position against the upper seat stop 331. The sealing contact between the valve ball 305 and the upper seat 310 is lost and fluid enters into the valve ball 305 and the spacer 332. As the fluid enters the valve ball 305 through the opening between the valve ball 305 and the upper seat 310, the sealing contact between the lower seat 320 and the valve ball 305 is maintained, so little or no fluid escapes the ball valve assembly 301. The position in which sealing contact is lost between the upper seat 310 and the valve ball 305, and sealing contact is maintained between the lower seat 320 and the valve ball 305 is defined as the "lower position" of the valve ball.

Allowing the fluid to enter the valve ball 305 causes the fluid pressure to no longer be applied to the top of the valve ball 305 from the outside, but to be applied to the bottom of the valve ball 305 from the inside. By applying pressure to the inner surface of the valve ball 305, the fluid force is more directly translated to the lower seat 320 and the lower wave spring 323, which allows crushing forces across the diameter of the valve ball 305 to be avoided. Relocating the fluid force more directly to the lower seat 320 helps to avoid deforming of the valve ball 305 when the fluid pressure becomes too great.

The ball valve assembly 301 goes through an analogous reverse movement when the fluid pressure is coming up from below the valve ball 305 through the lower passage 352. The fluid pressure pushes the valve ball 305 and the upper seat 310 upward in the axial direction, further compressing the upper wave spring 314 from the original partially-compressed state of the wave spring 314. As the valve ball 305 and the upper seat 310 move upward, the lower seat 320 contacts the spacer 332. The spacer 332 prevents any further upward movement of the lower seat 310. If the valve ball 305 and the upper seat 310 continue to move upward from additional fluid pressure, the lower seat 320 will stay in contact with the spacer 332 and not move upward with the valve ball 305 and the upper seat 310. The sealing contact between the valve ball 305 and the lower seat 320 is lost, and fluid enters into the valve ball 305 and the spacer 332. As the fluid is entering the valve ball 305 through the opening between the valve ball 305 and the lower seat 320, the sealing contact between the lower seat 320 and the valve ball 305 is maintained, so little or no fluid escapes the ball valve assembly 301. The position in which sealing contact is lost between the lower seat 320 and the valve ball 305, and sealing contact is maintained between the upper seat 310 and the valve ball 305 is defined as the "upper position" of the valve ball 305. In the upper position of the valve ball 305, when the fluid enters the valve ball 305 in the opening between the valve ball 305 and the lower seat 320, the fluid force is applied to the inner surface of the valve ball 305.

The ball valve assembly 301 may be retained into the housing 350 by a securing mechanism 340. In one embodiment, the securing mechanism 340 may comprise a split ring 341, a support ring 342, and a snap ring 343. The split ring 341, which may include a plurality of ring segments, is received into groove 353 of the housing 350. The split ring 341 segments may be placed down into the passage 351 one at a time, and then moved radially outward into the groove 353. After the segments of the split ring 341 are in the groove 353, the support ring 342 is placed into the passage 351 to be radially inside of the split ring 341. The support ring 342 helps to prevent the segments of the split ring 341 from moving radially inward. A snap ring 343 may be used to fix the support ring 342 in place. The snap ring 343 is radially compressed, placed in alignment with the groove 344 in the split ring 341, and released to radially expand into groove 344. The snap ring 343 sits above the support ring 342 and keeps the securing mechanism 340 in a fixed position. Those having ordinary skill in the art will appreciate that other securing mechanisms, such as set screw, may be used without departing from the scope of the present invention.

Shown in this embodiment, a spacer 360 is disposed between the securing mechanism 340 and the upper wave spring 314. The spacer 360 disposed between the securing mechanism 340 and the upper wave spring 314 is not necessary to the design, but it may be present to properly fit the wave springs 314, 323 into the ball valve assembly 301. If the spacer 360 is not present, then the upper wave spring 314 may be positioned between the upper seat 310 and the securing mechanism 340. If the spacer 360 is present, as shown in FIG. 3, the upper wave spring 314 may be positioned between the upper seat 310 and the spacer 360.

A groove 326 may be formed in the lower seat 320. The purpose of the groove 326 is to fit a lower seal 327 around the lower seat 320. The lower seal 327, which may be an O-ring, prevents fluid pressure from bypassing the ball valve assembly 301 entirely. The housing 350 may also have a groove 354 for an upper seal 315, which may be an O-ring. The upper seal 315 seals between the upper seat 310 and the housing 350. The seals 327, 315 help to prevent fluid from flowing around the ball valve assembly 301. Fluid flow around the ball valve assembly 301 can erode or corrode the components, which could degrade the performance of the ball valve.

Figure 1A:
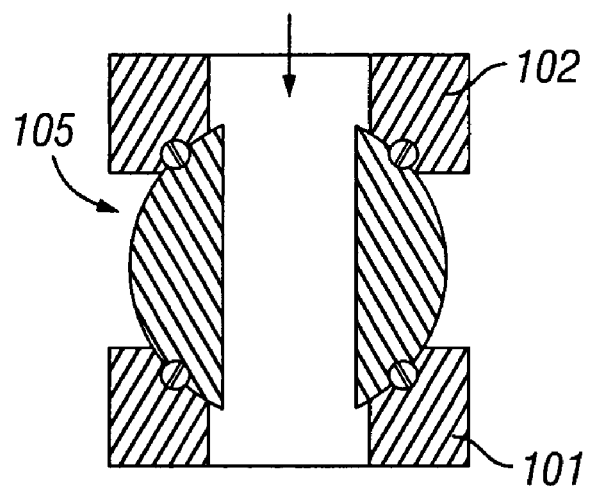
FIGS. 1A and 1B are cross-sectional views of a prior ball valve assembly.
Figure 1B:
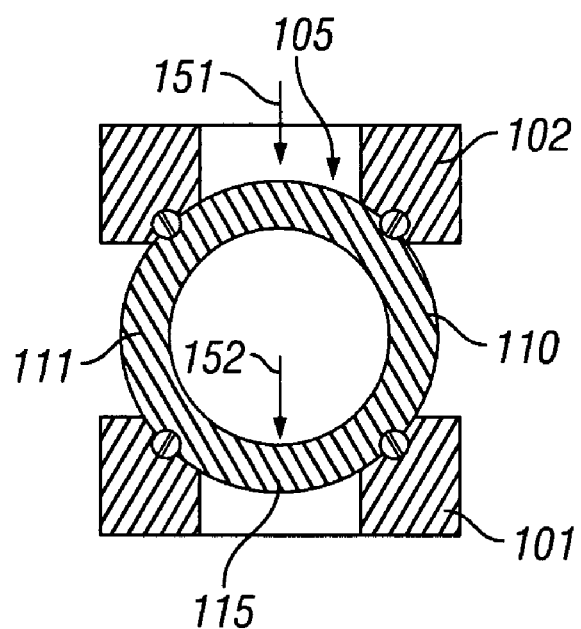
Figure 2:
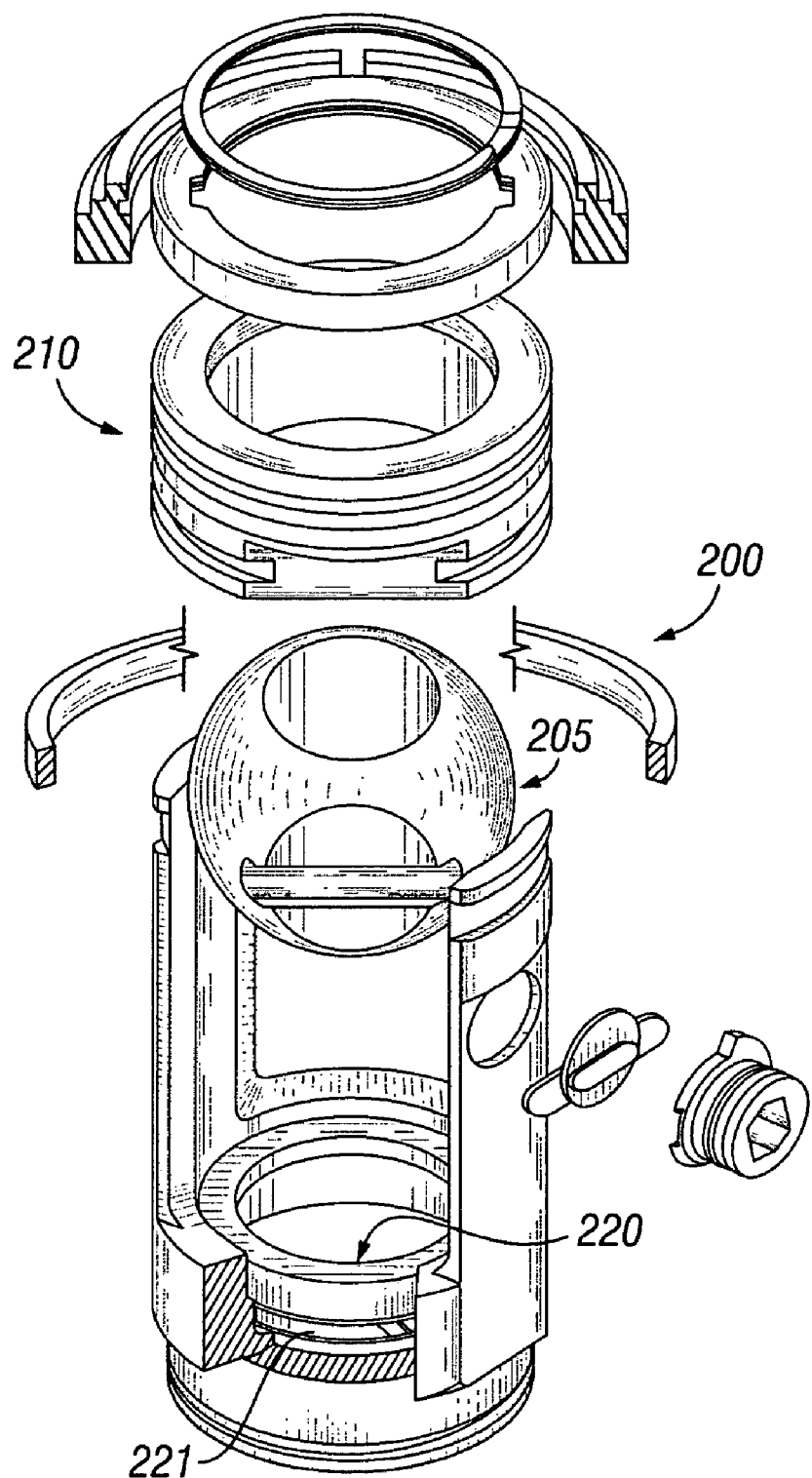
FIG. 2 is an exploded view of a prior art internal blowout preventer.
Figure 6:
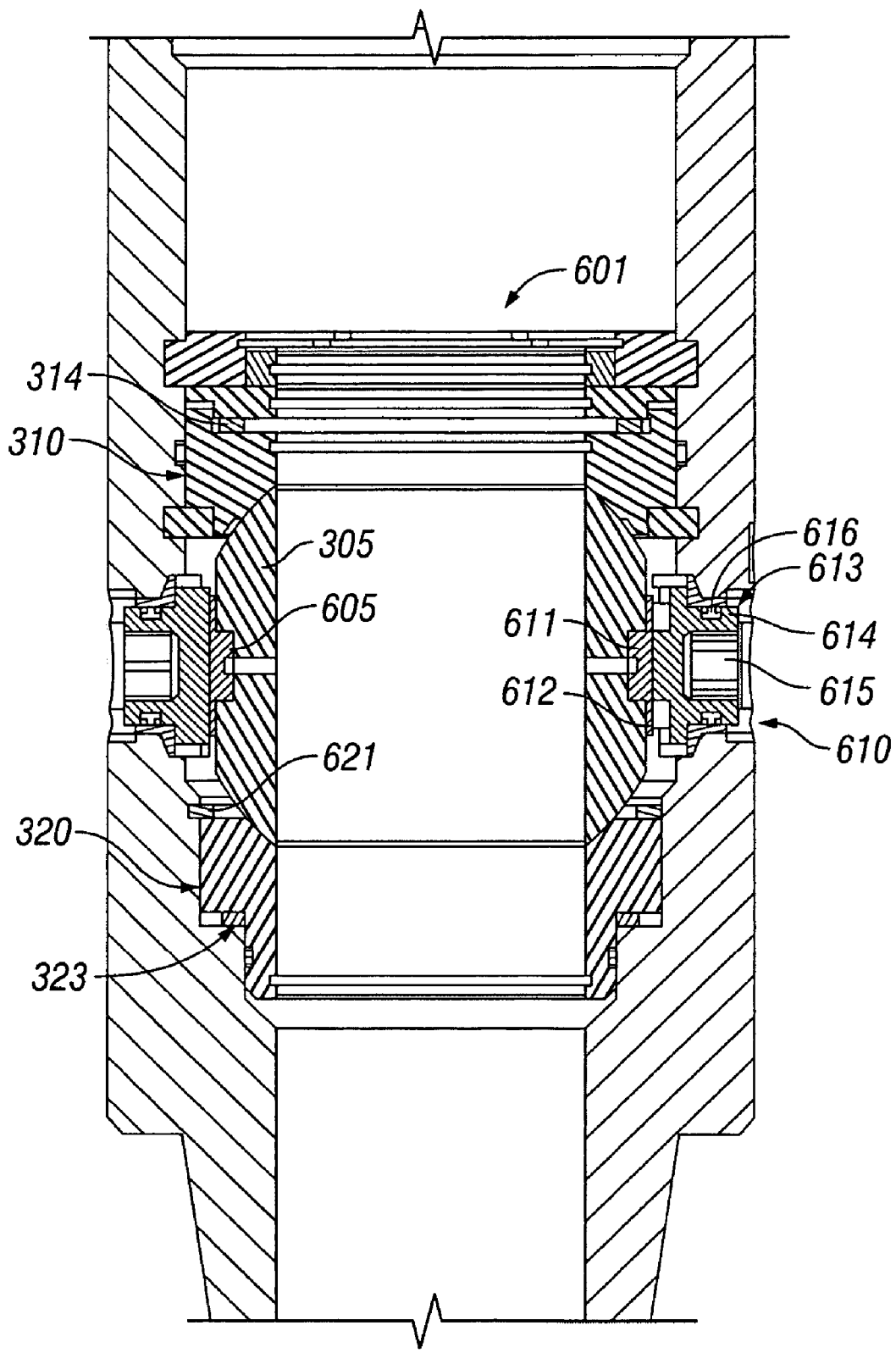
FIG. 6 is a cross-sectional view of a ball valve mechanism in accordance with an embodiment of the present invention.

Shown in FIG. 6 is another embodiment of the present invention. Similar to the embodiment of FIG. 3, a ball valve assembly 601 includes an upper seat 310 and a lower seat 320, biased towards a valve ball 305. In this embodiment, the seats 310, 320 are biased with an upper wave spring 314 and a lower wave spring 323. The embodiment has a lower seat stop 621 which limits the axial movement of the lower seat 320, instead of having a spacer 332 extending down from the upper seat stop 331 as shown in FIG. 3. The valve ball 305 is rotated between the open and closed positions of the valve ball 305 by a rotation device 610 fitting into a recess 605 on the valve ball 305. The rotation device includes a tongue shaped rib 611, a rotating disc 612, and an actuator 613. In the recess 605 fits the tongue shaped rib 611, where the tongue shaped rib is attached to the rotating disc 612. The rotating disc 612 is interlocking with the actuator 613, where the means of interlocking between the rotating disc 612 and the actuator 613 is obvious to those of ordinary skill in the art. FIG. 2 shows a method used in the prior art, which may be used for this invention. The actuator 613 has a stem 614, in which the stem 614 has a wrench fitting 615 to receive an Allen wrench or other interlocking shape. The stem 614 may have ball bearings 616 located around the stem 614 to reduce friction in the rotation of the rotation device 610. FIG. 4 shows how the rotation device 610 may fit into the embodiment of the ball valve assembly 401 when a spacer 332 is present. Those having ordinary skill in the art will appreciate that other rotation means may be designed to rotate the valve ball 305 without departing from the scope of the present invention.

Figure 5:
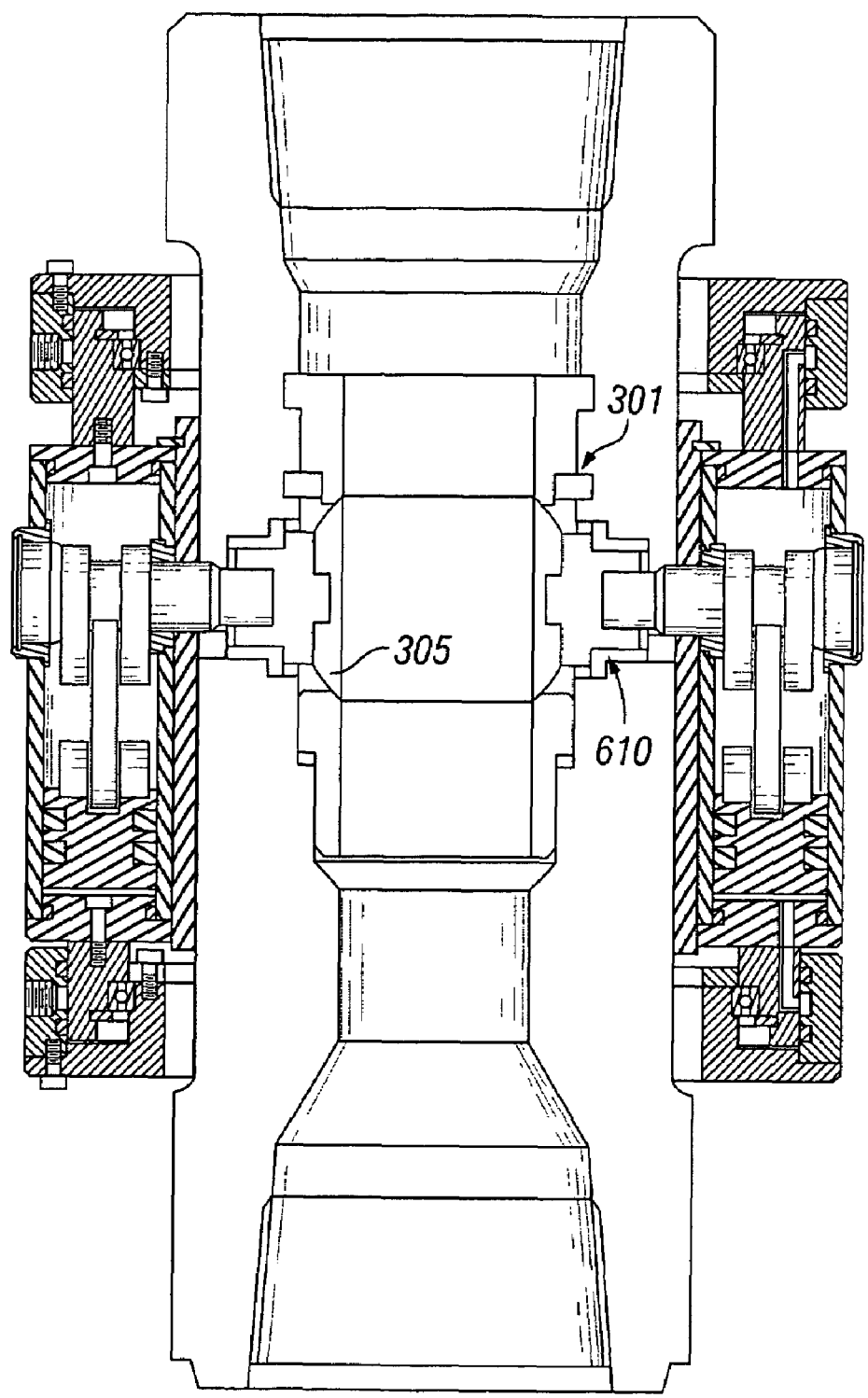
FIG. 5 is a cross-sectional view of a prior art ball valve actuation device.

The rotation device 610 can be rotated manually with a wrench, or by a machine drive. For the use in an IBOP, it is preferable for the ball valve assembly to be rotated by a machine drive for reliability and speed. An example of a prior art machine driven actuation device for the ball valve assembly 301 is shown in FIG. 5. An example of a machine actuation device is disclosed in U.S. Pat. No. 5,507,467, issued to Mott and incorporated herein by reference in its entirety. In this configuration, the ball valve assembly 301 can be remotely operated in the event the valve ball 305 needs to be rotated quickly and correctly.

In one or more embodiments, the ball valve assembly may be designed for sealing contact between the seats and the valve ball may be designed to "break", or lose sealing contact, at a selected pressure. When the selected pressure is reached, the valve ball will move from the neutral position into the upper position or lower position to prevent too high of pressure from being applied across the valve ball. Those having ordinary skill in the art will appreciate that the pressure limits (i.e. pressure that is "too high") may vary depending on the strength of the valve ball, in addition to other factors.

Figure 7A:
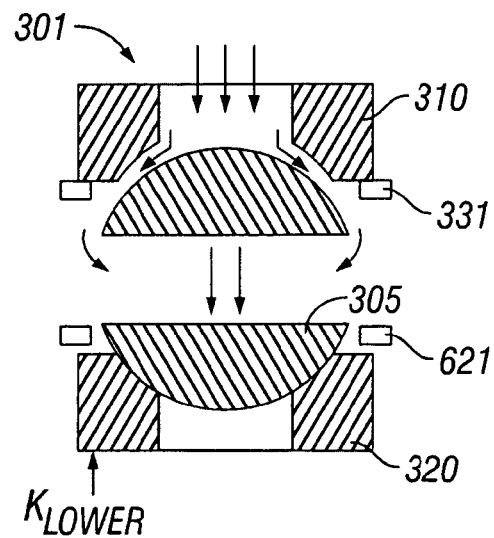
FIGS. 7A, 7B, and 7C are cross-sectional views of a ball valve mechanism in accordance with one embodiment of the present invention.
Figure 7B:
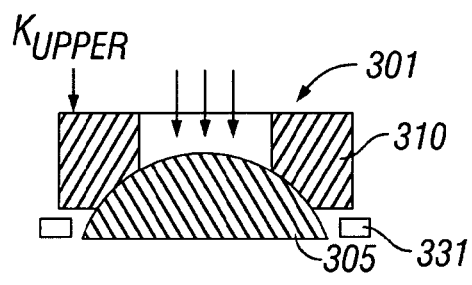
Figure 7B:
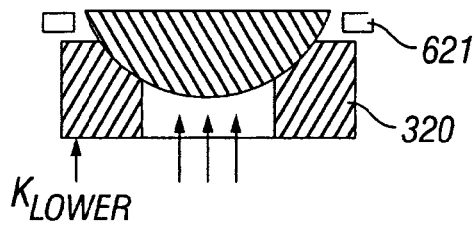

The neutral position of the valve ball assembly 301 is shown in FIG. 7B. The valve ball 305 is in sealing contact with the upper seat 310 and the lower seat 320, in which the valve ball 305 "floats" between the two seats. The ball valve assembly 301 seals between the valve ball 305 and the upper seat 310 and the lower seat 320 in both axial directions of flow, in which the flow pressure is of a value less than a selected pressure. When the fluid pressure reaches a selected pressure, the ball valve assembly will move into either a lower position or an upper position, depending on the direction of the fluid pressure. In the lower position, shown in FIG. 7A, the valve ball 305 is pushed against the lower seat 320 from the fluid pressure from above the ball valve assembly 301. In the upper position, shown in FIG. 7C, the valve ball 305 is pushed against the upper seat 310 from the fluid pressure from below the valve ball assembly 301. To be most effective, the valve ball 305 should have an axial travel greater than axial travel of the upper seat 310 and the lower seat 320.

Embodiments of the present invention may be designed in which the selected pressures to move the valve ball into the upper position and the lower position are different from one another. For example, in an embodiment in which the ball valve assembly is used as an IBOP, higher fluid pressures are expected to enter from below the ball valve assembly, as compared to the fluid pressures entering from above the ball valve assembly. The selected pressure to move the ball valve assembly into the upper position in FIG. 7C, an "upper position pressure," could be more than the selected pressure to move the ball valve assembly into the lower position in FIG. 7A, a "lower position pressure," to accommodate for the higher pressure entering from the bottom.

Figure 7C:
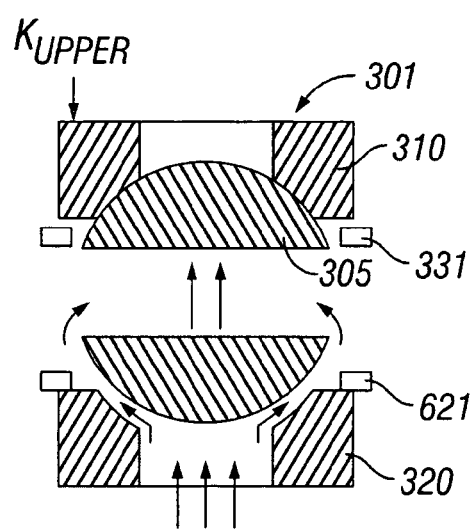

In the upper position in FIG. 7C, the upper position pressure for the ball valve assembly 301 is established from a balance of several factors: an upper spring coefficient, a lower seat travel distance, and a lower piston area. The upper spring coefficient, $k_{upper}$, is the "stiffness" or "spring rate" of the upper biasing mechanism, in which a biasing mechanism is stiffer with a higher coefficient. The lower seat travel distance is the distance the lower seat 320 may travel between the lower seat stop 621 and the lower wave spring. The lower piston area is the area inside the diameter of the seal between the lower seat 320 and the valve ball 305, which is the effective area upon which the fluid pressure acts. The upper position pressure may be increased by, for example, an increase in the upper spring coefficient, an increase in the lower seat travel distance, a decrease in the lower piston area, or a combination thereof. The upper position pressure may be decreased by an inverse of the previous example, in which the upper spring coefficient may be decreased, the lower seat travel may be decreased, the lower piston area may be increased, or a combination thereof. Those having ordinary skill in the art will appreciate that a spring coefficient may refer to any biasing mechanism, such as Bellville washers, helical springs, or elastomeric material, in which the biasing mechanism may exert a force over a compressed or extended distance.

In the lower position in FIG. 7A, the lower position pressure for the ball valve assembly 301 is established from a balance of several factors: a lower spring coefficient, an upper seat travel distance, and an upper piston area. The lower spring coefficient, $k_{lower}$, is the "stiffness" or "spring rate" of the lower biasing mechanism. The upper seat travel distance is the distance the upper seat 310 may travel between the upper seat stop 331 and the upper wave spring. The upper piston area is the area inside the diameter of the seal between the upper seat 310 and the valve ball 305, which is the effective area upon which the fluid pressure acts. The lower position pressure may be increased by, for example, an increase in the lower spring coefficient, an increase in the upper seat travel distance, a decrease in the upper piston area, or a combination thereof. The lower position pressure may be decreased by an inverse of the previous example, in which the lower spring coefficient may be decreased, the upper seat travel may be decreased, the upper piston area may be increased, or a combination thereof.

Embodiments of the present invention have one or more of the following advantages. By avoiding crushing loads on the valve ball, more economical valve balls may be used because of the reduced strength requirements. For example, a valve ball may have a thinner wall, thereby requiring less material to manufacture. Further, the valve ball may be made with a material having a relatively lower tensile strength than prior art valve balls. The economic advantage is particularly pronounced in high pressure applications, in which the ball valve assembly must withstand greater than 15,000 psi.

As shown above, the ball valve assembly makes sealing contact in both directions of the passage, not allowing fluid flow when the valve ball is in its closed position. Having both the upper and lower seats being biased towards the valve ball can be effective in a wide range fluids with a wide range of pressures. Low pressure fluids will not provide enough fluid force as to move the valve ball from the neutral position, sealing the fluid between the upstream seat and the valve ball. High pressure fluids will provide enough fluid force as to move the valve ball in the direction of the fluid flow, sealing the fluid between the downstream seat and the valve ball. As well, the range of fluids which may be used in the present invention include that of both high and low viscosity. The openings made between the valve ball and the lower and upper seats when the valve ball is in the upper or lower position can be designed to allow high viscosity fluid to be allowed to flow into the valve ball, or designed to allow fluids with particles in them to flow through into the valve ball. Being adaptable to such a range of fluids is ideal for an IBOP because the expected drilling mud that can be passing through the ball valve assembly varies in consistency and may contain sediment or other solids within the drilling mud.

Embodiments of the present invention may also be designed to replace existing ball valve mechanisms. For example, a housing having a ball valve mechanism similar to that disclosed by McKnight can have its upper seat removed. An upper seat and biasing mechanism can then be installed with a spacer to restrict movement of the upper seat. Although such an embodiment may require modification to the housing, significant savings can be achieved by reusing components.

While this invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A valve assembly comprising:
  a housing comprising a passage therethrough;
  a valve ball comprising a through hole, the valve ball disposed in the housing, wherein the valve ball is rotatable between an open position and a closed position, wherein in the open position the through hole is aligned with the passage, and in the closed position the through hole is misaligned with the passage;
  an upper seat disposed in the housing above the valve ball and biased toward the valve ball; and
  a lower seat disposed in the housing below the valve ball and biased toward the valve ball;
  wherein the valve ball is moveable in an axial direction between a lower position, a neutral position, and an upper position in response to pressure;
  wherein a prevention mechanism prevents sealing contact between the valve ball and the upper seat when the valve ball is in the lower position; and wherein the prevention mechanism prevents sealing contact between the valve ball and the lower seat when the valve ball is in the upper position.

2. The valve assembly of claim 1, wherein the prevention mechanism comprises:
   a spacer disposed in the housing between the upper seat and the lower seat and at least partially surrounding the valve ball; and
   a seat stop disposed adjacent to the spacer.

3. The valve assembly of claim 1, further comprising:
   a securing mechanism disposed in the housing above the upper seat.

4. The valve assembly of claim 3, wherein the securing mechanism comprises:
   a plurality of ring segments fitting into a groove in the passage;
   a support ring within the passage to prevent the plurality of ring segments from moving radially inward; and
   a snap ring fitting into the plurality of ring segments to prevent the axial movement of the support ring.

5. The valve assembly of claim 1, wherein at least one of the upper seat and the lower seat is biased towards the valve ball by a wave spring.

6. The valve assembly of claim 1, further comprising:
   a sealing element disposed in a groove formed in the lower seat, wherein the sealing element provides a seal between the lower seat and the housing.

7. The valve assembly of claim 1, further comprising:
   a sealing element disposed in a groove formed in the housing, wherein the sealing element provides a seal between the upper seat and the housing.

8. The valve assembly of claim 1, wherein the valve assembly is configured to be an internal blowout preventer.

9. The valve assembly of claim 1, wherein the prevention mechanism comprises a first and second seat stop disposed in the housing between the upper seat and the lower seat.

10. An internal blowout preventer comprising:
    a housing having a passage therethrough, wherein the housing is configured to be connected to a drill string;
    a valve ball having a through hole and disposed in the housing, said valve ball rotatable between an open position and a closed position, wherein in the open position the through hole is aligned with the passage, and in the closed position the through hole is misaligned with the passage, wherein the valve ball is moveable in an axial direction between a lower position, a neutral position, and an upper position in response to pressure;
    a rotation means for rotating the valve ball between the open position and the closed position;
    an upper seat disposed in the housing above the valve ball;
    a lower seat disposed in the housing below the valve ball;
    a biasing means for biasing the upper seat into sealing contact with the valve ball when the valve ball is in the upper position and the neutral position;
    a biasing means for biasing the lower seat into sealing contact with the valve ball when the valve ball is in the neutral position and the lower position;
    a spacer disposed in the housing between the upper seat and the lower seat and at least partially surrounding the valve ball; and
    a seat stop disposed adjacent to the spacer;
    wherein one of the spacer and the seat stop prevents sealing contact between the valve ball and the upper seat when the valve ball is in the lower position; and
    wherein the other of the spacer and the seat stop prevents sealing contact between the valve ball and the lower seat when the valve ball is in the upper position.

11. The internal blowout preventer of claim 10, further comprising:
    a securing mechanism disposed in the housing above the upper seat.

12. The internal blowout preventer of claim 11, wherein the securing mechanism comprises:
    a plurality of ring segments fitting into a groove in the passage;
    a support ring within the passage to prevent the plurality of ring segments from moving radially inward; and
    a snap ring fitting into the plurality of ring segments to prevent the axial movement of the support ring.

13. The internal blowout preventer of claim 10, wherein at least one of the upper seat and the lower seat is biased towards the valve ball by a wave spring.

14. The internal blowout preventer of claim 10, further comprising:
    a sealing element disposed in a groove formed in the lower seat, wherein the sealing element provides a seal between the lower seat and the housing.

15. The internal blowout preventer of claim 10, further comprising:
    a sealing element disposed in a groove formed in the housing, wherein the sealing element provides a seal between the upper seat and the housing.

16. A valve assembly comprising:
    a housing having a passage therethrough;
    a valve ball having a through hole and disposed in the housing, said valve ball rotatable between an open position and a closed position, wherein in the open position the through hole is aligned with the passage, and in the closed position the through hole is misaligned with the passage, wherein the valve ball is moveable in an axial direction between a lower position, a neutral position, and an upper position in response to pressure;
    a rotation means for rotating the valve ball between the open position and the closed position;
    an upper seat disposed in the housing above the valve ball;
    a lower seat disposed in the housing below the valve ball;
    a biasing means for biasing the upper seat into sealing contact with the valve ball when the valve ball is in the upper position and the neutral position; and
    a biasing means for biasing the lower seat into sealing contact with the valve ball when the valve ball is in the neutral position and the lower position;
    wherein a prevention mechanism prevents sealing contact between the valve ball and the upper seat when the valve ball is in the lower position; and
    wherein the prevention mechanism prevents sealing contact between the valve ball and the lower seat when the valve ball is in the upper position.

17. The valve assembly of claim 16, wherein the prevention mechanism comprises:
    a spacer disposed in the housing between the upper seat and the lower seat and at least partially surrounding the valve ball; and
    a seat stop disposed adjacent to the spacer.

18. The valve assembly of claim 17, wherein the securing mechanism comprises:
- a plurality of ring segments fitting into a groove in the passage; and
- a support ring within the passage to prevent the plurality of ring segments from moving radially inward; and
- a snap ring fitting into the plurality of ring segments to prevent the axial movement of the support ring.

19. The valve assembly of claim 16, further comprising:
a securing mechanism disposed in the housing above the upper seat.

20. The valve assembly of claim 16, wherein at least one of the upper seat and the lower seat is biased towards the valve ball by a wave spring.

21. The valve assembly of claim 16, further comprising:
a sealing element disposed in a groove formed in the lower seat, wherein the sealing element provides a seal between the lower seat and the housing.

22. The valve assembly of claim 16, further comprising:
a sealing element disposed in a groove formed in the housing, wherein the sealing element provides a seal between the upper seat and the housing.

23. The valve assembly of claim 16, wherein the prevention mechanism comprises a first and second seat stop disposed in the housing between the upper seat and the lower seat.

* * * * *